(12) United States Patent  
Phely (10) Patent No.: US 9,867,327 B2  
(45) Date of Patent: Jan. 16, 2018

(54) PNEUMATIC FURROW

(71) Applicant: OTICO, Chalmaison (FR)

(72) Inventor: Olivier Phely, Thenisy (FR)

(73) Assignee: OTICO, Chalmaison (FR)

( * ) Notice: Subject to any disclaimer, the term of this patent is extended or adjusted under 35 U.S.C. 154(b) by 0 days.

(21) Appl. No.: 15/188,171

(22) Filed: Jun. 21, 2016

(65) Prior Publication Data

US 2017/0006768 A1  Jan. 12, 2017

(30) Foreign Application Priority Data

Jul. 10, 2015  (FR) ..................... 15 56600

(51) Int. Cl.
```
A01C 5/06      (2006.01)
A01B 29/04     (2006.01)
B60C 7/12      (2006.01)
B60C 11/03     (2006.01)
```
(52) U.S. Cl.
CPC ............ *A01C 5/068* (2013.01); *A01B 29/043* (2013.01); *B60C 7/12* (2013.01); *B60C 11/0311* (2013.01)

(58) Field of Classification Search
CPC ..... A01B 29/04; A01B 29/041; A01B 29/043; B60C 2007/005; B60C 7/12; B60C 7/125
USPC ............ 172/519, 537, 538; 152/158, 209.12
See application file for complete search history.

(56) References Cited

U.S. PATENT DOCUMENTS

| | | | | |
|---|---|---|---|---|
| 1,682,896 A * | 9/1928 | Dunham | ............. | A01B 29/041 172/537 |
| 2,040,710 A * | 5/1936 | Riehl | ................... | A01B 29/041 172/154 |
| 2,525,545 A * | 10/1950 | Hanson | ................ | A01B 29/041 172/536 |
| 2,713,373 A * | 7/1955 | Daugherty | ............... | B60C 7/12 152/158 |
| 4,362,202 A * | 12/1982 | Sacks | ........................ | B60C 3/02 152/158 |
| 7,124,835 B2 * | 10/2006 | Piou | ....................... | A01B 29/06 172/519 |
| 8,297,325 B2 * | 10/2012 | Phely | ....................... | B60C 7/12 152/379.3 |

(Continued)

FOREIGN PATENT DOCUMENTS

| DE | 92 05 660 U1 | 8/1992 |
|---|---|---|
| DE | 10 2010 037 872 | * 9/2010 |

(Continued)

OTHER PUBLICATIONS

French Preliminary Search Report dated May 4, 2016 in French Application 15 56600, filed on Jul. 10, 2015 ( with English Translation of Categories of Cited Documents).

*Primary Examiner* — Gary Hartmann  
(74) *Attorney, Agent, or Firm* — Oblon, McClelland, Maier & Neustadt, L.L.P.

(57) ABSTRACT

A tire for a furrow press roller comprises a sole via which the tire is mounted on a field roller support, a tread opposite to the sole, and two sidewalls connecting the tread to the sole. The sole, the tread and the sidewalls together delimit a non-inflatable chamber. The tread comprises at least one crest and two shoulders each connecting the crest to a respective sidewall. The chamber extends partially at least laterally under the shoulders and radially into the crest.

11 Claims, 6 Drawing Sheets

(56) References Cited

U.S. PATENT DOCUMENTS

| | | | | |
|---|---|---|---|---|
| 8,491,451 B2* | 7/2013 | Phely | .................... | A01B 29/043 |
| | | | | 172/537 |
| 8,567,463 B2* | 10/2013 | Phely | ........................ | B60C 7/12 |
| | | | | 152/379.3 |
| 8,695,721 B2* | 4/2014 | Phely | .................... | A01B 29/043 |
| | | | | 152/209.12 |
| 2008/0230162 A1* | 9/2008 | Piou | .................... | B60C 11/0311 |
| | | | | 152/209.12 |
| 2013/0037284 A1 | 2/2013 | Phely et al. | | |
| 2014/0124112 A1* | 5/2014 | Phely | .................... | B60C 17/009 |
| | | | | 152/450 |
| 2016/0286712 A1* | 10/2016 | Phely | .................... | A01B 29/043 |

FOREIGN PATENT DOCUMENTS

| | | | |
|---|---|---|---|
| EP | 1 810 560 | * | 1/2007 |
| EP | 2 556 734 A1 | | 2/2013 |

* cited by examiner

PNEUMATIC FURROW

FIELD OF INVENTION

The invention relates to a furrow-opening tire, particularly designed to be mounted on a field roller.

BACKGROUND OF INVENTION

In order to form furrows in fields of land, use is generally made of an elongate roller which is moved across the field. Such a tool is sometimes referred to in the art as a "furrow press". The roller comprises an elongate cylindrical support and several tires mounted next to one another on the support, each tire operating in a respective furrow.

Each tire conventionally comprises a sole-forming part via which the tire is mounted on the cylindrical support, a tread-forming part via which the tire is in contact with the bottom of the furrow and two sidewall-forming parts each connecting the tread to the sole.

French patent application 15 52687 filed on Mar. 30, 2015 in the name of the Applicant Company describes a furrow-opening tire. The tread extends over a reduced portion of the width of the tire, at the radial end thereof. The side walls are formed as extensions of the tread. They connect to the sole. The sidewalls have an inclination that varies little and substantially continuously from the tread to the sole. These tires have a radial cross section in the overall shape of an equilateral triangle. The apex of this triangle corresponding to the radial end of this tire is rounded. These tires are able to work the ground effectively. They have good self-cleaning capability. Furthermore, the tires are effective at holding themselves against one another over time.

These tires make it possible to form furrows that are very close together. In other words, the strip of land between two adjacent furrows is narrow. The depth to which the tread penetrates the earth is very much dependent on the properties of this earth, such as its composition, its compactness and its wetness.

In order to create more widely-spaced furrows it is possible to interpose spacers between the tires. This impairs the self-cleaning capacity of the roller. Earth tends to build up on the spacers because of the rigidity thereof.

Furthermore, the spacers generally have an exterior surface of cylindrical shape. This means that the strip of land between two furrows becomes flattened.

SUMMARY OF INVENTION

The invention seeks to improve the situation.
To this end, the applicant company proposes:
a tire for a furrow press roller of the type comprising:
a sole via which the tire is mounted on a field roller support,
a tread opposite to the sole, and
two sidewalls connecting the tread to the sole,
the sole, the tread and the side walls together delimiting a non-inflatable chamber. The tread comprises:
at least one crest-shaped portion, and
two shoulder portions each connecting the crest-shaped portion to a respective sidewall.
The chamber extends partially at least laterally under the shoulder portions and radially into the crest-shaped portion.

The proposed tire offers a tread and a large active area. It allows the hollow part of a furrow, the sides thereof and the strip of land between two adjacent furrows to be worked. In operation, the crest-shaped portion is able to move relative to the sole while the shoulders of the tread deform. The detachment of earth over a large part of the width of the tire is effective. In particular, the lowest-height zones of the tire, namely the shoulders that shape the portion of land between two furrows are continuously cleaned and do not become very soiled. Under most working conditions, a scraper becomes superfluous.

The tool may exhibit the following optional features, alone or in combination with one another:
The shoulder portions are of convex overall shape. The shoulders flex outward during operation. This makes the removal of earth easier.
An exterior surface of the crest-shaped portion bears at least one relief element. The tire and the roller equipped therewith therefore have better grip on the ground as they turn. The risks of rotation being blocked are reduced, particularly when the earth is heavy or sticky and under cornering.
The sole and/or the tread comprise at least one portion projecting into the chamber under the shoulder portions and arranged in such a way as to limit, through abutment, the extent to which the sole and the tread can move closer together. The amount of travel that the tread has in collapsing toward the sole during operation is precisely regulated.
At least one of the sidewalls has a frustoconical lateral surface. A difference in axial preload appears between the tread and the sole. Thus, the treads of two adjacent tires can be held firmly against one another in order to improve the continuity of the exterior surface of the roller whereas the soles have axial mobility encouraging the absorption of load, particularly under cornering.
At least one of the two shoulder portions is connected to a respective sidewall so that the overall direction of the shoulder portion and the overall direction of the respective sidewall form an angle of between 90° and 135°. This range allows the sidewalls to be urged laterally outward as the tread collapses while at the same time allowing good deformation and good self-cleaning and preventing the shoulder from forming kinks or wobbling undesirably in use, as this would prove detrimental to self-cleaning, to the shape of the furrow created and to tire wear.
The crest-shaped portion has inclined flanks such that the overall direction of each of the flanks forms an angle of between 0° and 45° with respect to a radial direction. An angle smaller than 45° ensures good penetration into the ground, even when the earth is hard or dry.
At least one of the two shoulder portions is connected to the crest-shaped portion so that the overall direction of the shoulder portion and the overall direction of the crest-shaped portion form an angle of between 90° and 120°. This range of angles makes it possible to limit the buildup of earth and make it easier to slip and be removed. Kinking of the crest against the shoulder is avoided. Tire damage caused by soil is limited. Good dynamic behavioral independence between the shoulders and the crest is assured. The crest moves substantially radially with very little deformation while the shoulders have a bending movement and a deformation that encourages the detachment of the earth.
The crest-shaped portion extends radially beyond the shoulder portions over a height of between 30 and 120 millimeters. Such a range of values makes it possible to form a furrow that is deep enough that it does not then become filled with debris or dust while at the same time being resistant to collapsing in on itself and to erosion.

The ratio of the width over which the crest-shaped portion extends to the total width of the tire is between 15% and 70%. Beyond that range, correct penetration of the crest into the ground is compromised either because the resistance of the ground is too great or because the crest has a tendency to flex before penetrating the ground.

In another aspect of the invention the Applicant Company proposes a furrow-opening roller comprising a support and at least one tire as defined hereinabove which is mounted on the support.

BRIEF DESCRIPTION OF DRAWINGS

The present invention will be better understood from reading the detailed description of a number of embodiments considered as entirely nonlimiting examples and illustrated in the attached drawings in which.

DETAILED DESCRIPTION

The drawings and the description that follows essentially contain elements of determined nature. They may therefore be of use not only in making it easier to understand the present invention but also in contributing to the defining of same, as appropriate. It should be pointed out that elements such as the geometry of the profile of a tire are difficult to define completely in any way other than by a drawing.

Figure 1:
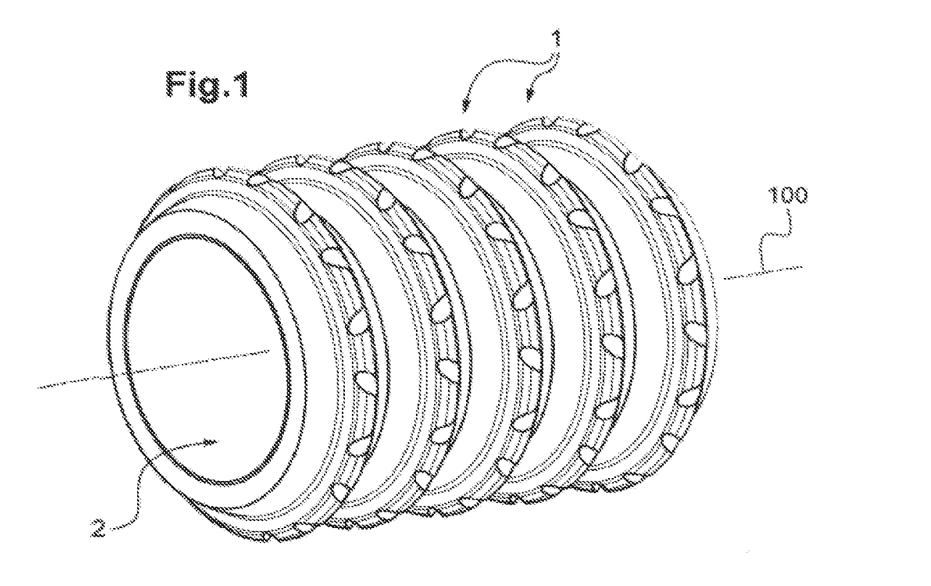
FIG. 1 is a perspective view of a portion of roller equipped with tires according to the invention.
Figure 2:
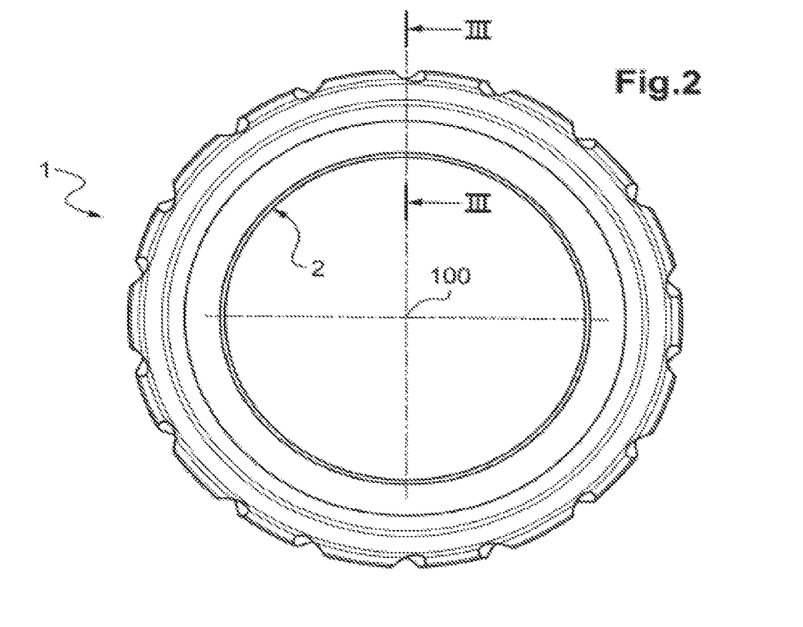
FIG. 2 is a side view of the portion of roller of FIG. 1.
Figure 3:
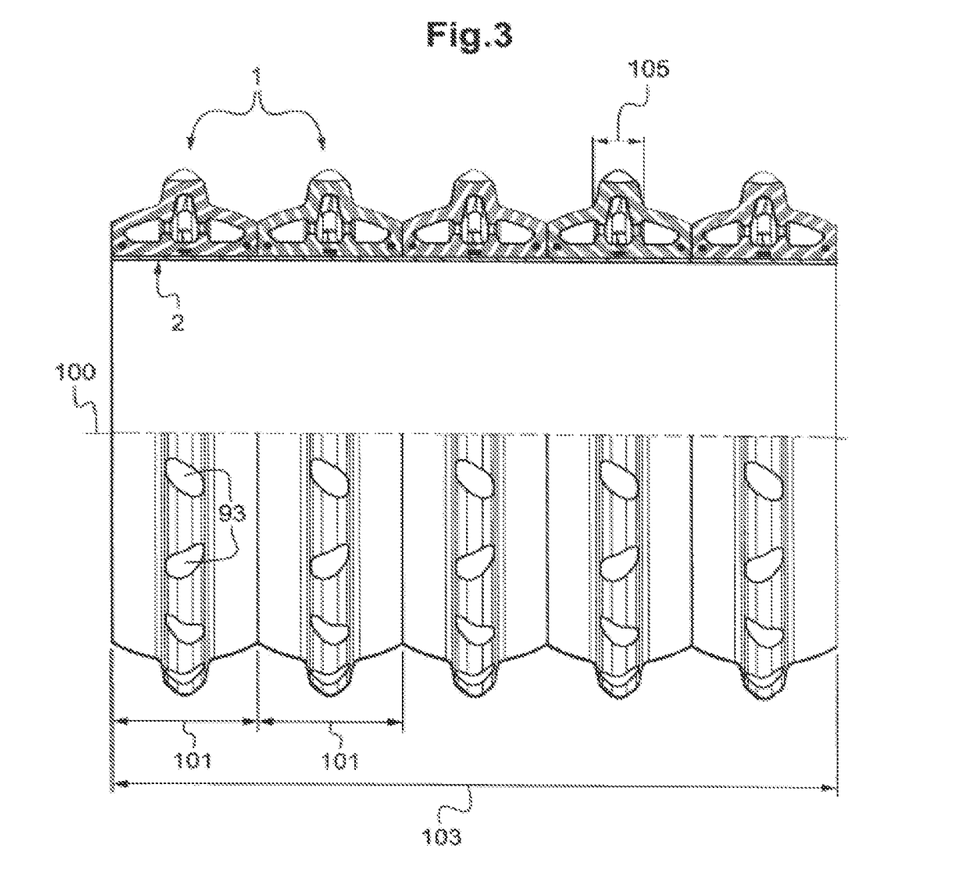
FIG. 3 is a front and partially sectioned view of the portion of roller of FIG. 1.

Reference is made to FIGS. 1 to 3.

They show a portion of a field press for creating furrows. The press roller corresponds to what is known in the art as a furrow press. The roller comprises a support 2 which is generally cylindrical and elongate, and a plurality of tires 1 slipped on to the support 2. The tires 1 are positioned one beside the other in the longitudinal direction of the support 2. The tires 1 are distributed longitudinally in a way that corresponds to what is known in the art as the inter-row spacing, which means to say the spacing between two adjacent furrows. In this instance, the tires are in contact with one another.

The tires 1 are clamped together axially, in the longitudinal direction of the support 2. At each of its ends, which ends are not depicted here, the roller comprises a flange, or cheek, fixed to the support 2. The axial clamping of the tires 1 is maintained by the flanges.

The roller is intended to be mounted to rotate about its longitudinal axis, for example on the chassis of an agricultural machine.

Each tire 1 has an annular overall shape with a central axis 100. Each tire 1 has a midplane 200 perpendicular to the central axis 100. In the mounted state, the central axis 100 of each tire 1 is substantially coincident with the longitudinal axis of the support 2.

Each tire 1 has the overall appearance of symmetry with respect to its midplane 200.

The tires 1 are constrained in the longitudinal direction of the support 2. In the mounted state, the width of a tire 1 is less than the width of the tire 1 in the unconstrained state, for example by around 5%. In the example described here, the width 101 of the tire 1 in the mounted state is around 150 millimeters, whereas the width of this tire 1 at rest is around 157 millimeters. The flanges of the support 2 maintain this constrained state at the end of mounting and during operation. After mounting and not during operation the constrained state of the tire 1 is substantially uniform across the width of the roller.

Figure 4:
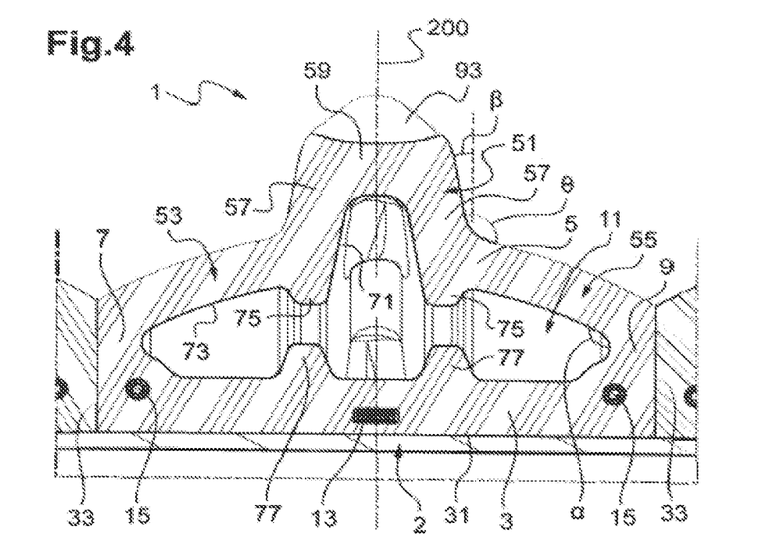
FIG. 4 shows a detail of FIG. 3.
Figure 5:
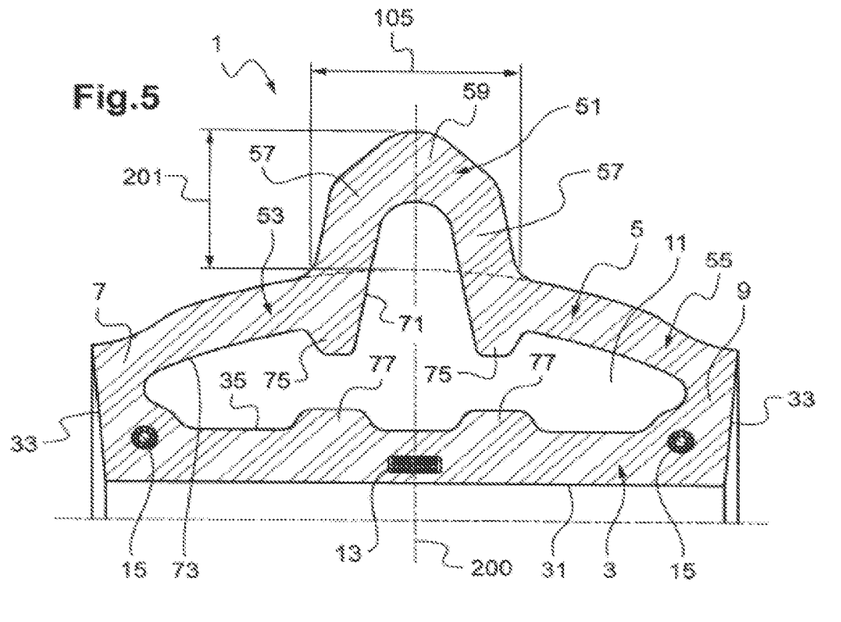
FIG. 5 shows a view in cross section of a tire according to the invention in the un-fitted state.

Reference is made to FIGS. 4 and 5. These each show the profile of a tire 1.

The tire 1 comprises a part forming a sole 3, a part forming a tread 5 and two parts forming sidewalls 7 and 9 which each connect the tread 5 to the sole 3. The sole 3 and the tread 5 each have an annular overall shape. During work, the tread 5 rolls along the ground, forming a furrow. The tread 5 touches both the bottom of the furrow and the sidewalls thereof and at least part of the strips of land separating adjacent furrows.

The sole 3, the tread 5 and the sidewalls 7, 9 together form a tire casing 1 around a chamber 11. The casing is substantially uniform around the circumference of the tire 1.

The tire 1 is mounted on the support 2 via the sole 3.

The sole 3 has a seat surface 31 of a shape corresponding to an exterior surface of the support 2. Each of the sidewalls 7, 9 has a lateral surface 33 intended to come into contact with a respective support surface. This support surface may be:

a lateral surface of a tire 1 mounted adjacently on the support 2, a face of a spacer mounted adjacent to the tire 1 on the support 2, a face of a flange of the support 2.

The tire 1 is mounted so that it is axially clamped. It is squashed widthwise, which means to say in its axial direction. The tires 1 are mounted with preload. This axial clamping limits the extent to which earth and/or debris can penetrate between the adjacent lateral surfaces 33 of tires 1.

In the embodiment of FIG. 4, the lateral surfaces 33 are substantially planar, in the unconstrained state and in the preloaded state (depicted in FIG. 4). The lateral surfaces 33 run substantially parallel to the midplane 200.

In the embodiment of FIG. 5, the lateral surfaces 33 are substantially frustoconical when unconstrained (as depicted in FIG. 5). When viewed in radial section, the lateral surfaces 33 are inclined with respect to the midpoint 200. The width of the tread 5 is greater than the width of the sole 3 which means that the cross section of the tire is of trapezoidal overall appearance. When the tire 1 is axially preloaded, the lateral surfaces 33 press against one another and adopt a planar or near-planar configuration. Through the effect of the elastic return of the tire 1, the clamping force between two tires 1 increases with increasing distance away from the central axis 100.

The inclined shape of the lateral surfaces 33 and the significant axial clamping at the treads 5 maintains the continuity of the exterior surfaces of the roller when subjected to high axial loadings, for example under cornering. The risk of soil or debris accidently finding its way in between two tires 1 is further reduced. The lighter clamping between adjacent soles 3 allows the tires 1 to slip a little about the support 2, notably under cornering. The roller behavior is more flexible. The risk of damage to the tires is reduced. If earth and/or debris manages to become inserted between two lateral surfaces 33, it has a tendency to be expelled radially, toward the outside or toward the inside, because of the inclination of these surfaces. The presence of soil and/or debris near the support 2, under the tread 5, is not as detrimental as it is between two treads 5 where it runs the risk of impairing the active parts of the tires 1. The continuity of the exterior surface of the roller is preserved. Self-cleaning is further improved.

The sole 3 has an interior surface 35 opposite to the seat surface 31. The interior surface 35 extends substantially between the sidewalls 7, 9.

The tread 5 comprises at least one crest-shaped portion 51 and two shoulder portions 53, 55.

Here, the tread 5 comprises a crest 51 and two shoulders 53, 55 each one connecting the crest 51 to a respective sidewall 7, 9. The crest 51 includes a crown 59 connected to each of the shoulders 53, 55 respectively by portions forming flanks 57.

In this instance, the crest 51 is centered on the midplane 200. The shoulders 53, 55 are symmetric with one another with respect to the midplane 200.

As an alternative, the tread 5 comprises several crests, for example two crests symmetric with one another with respect to a midplane. The crests are adjacent to one another. The shoulders 53, 55 connect the two axial end crests to the respective side wall 7, 9 via a respective shoulder 53, 55. Such a tire therefore forms as many furrows as there are crests 51 across its working width.

The tread 5 has an interior surface delimiting the chamber 11. This surface can be broken down into several portions including a crest interior surface portion 71 and two shoulder interior surface portions 73.

In the examples described here, the interior surfaces of the tread 5 comprise first portions forming projections 75 into the chamber 11, in this instance between the crest interior surface 71 and each of the shoulder interior surfaces 73. The interior surface 35 of the sole 3 bears second portions forming projections 77 into the chamber 11 facing the projections 75 of the tread 5. In operation, the tread 5 partially collapses toward the sole 3. Each projection 75 comes into abutment with a projection 77 so that the amount of collapse is limited. The projections 75 of the tread 5 are formed here substantially in the continuation of the flanks 57 of the crest 51. Such a configuration makes the tires 1 easier to manufacture. The casing has no local additional thickness. Each bit of material is positioned a small distance away from an interior or exterior surface of the casing. As the elastomer heats up through contact with a mold and thermal conduction, the temperature of the material rapidly equalizes throughout the casing. Manufacturing times are shorter.

In the embodiment of FIG. 4, the projections 75, 77 have similar shapes to one another. Their width, namely their dimension in the axial direction, is small. In the embodiment of FIG. 5, the projections 75 of the tread 5 have small widths while the projections 77 of the sole 3 have different shapes of great width. A difference in width between a projection 75, 77 and the corresponding projection 77, 75 allows the projections 75, 77 to rest against one another even when there is a relative shift of the sole 3 and of the tread 5 in the axial direction. In other words, as the tire 1 experiences shear stresses in the axial direction, for example under cornering, then the projections 75, 77 remain at least partially facing one another. Support at the end of collapse remains effective.

In alternative forms, the projections 75 of the tread 5 are wider than the projections 77 of the sole 3. In other alternative forms, of the sole 3 and the tread 5 just one may be provided with projections. The tire 1 may have no projection in the chamber 11. In this case, collapse is halted for example by the tread 5 coming into contact with the sole 3.

The chamber 11 extends laterally under the shoulders 53, 55. The chamber 11 also extends radially into the crest 51. The crest is hollow and the lateral portions of the tire 1 are likewise. Furthermore, the chamber 11 is a one-piece chamber. Each of the spaces left empty under the shoulders 53, 55 is in fluidic communication with the space left empty under the crest 51 and inside the latter. The chamber 11 is in fluidic communication with the outside, for example by means of an opening made in the sole at the time of manufacture. The tire 1 is of semi-hollow type. The tire 1 is not inflatable, making it easier to deform and self-clean by detaching earth which has a tendency to stick to the tire 1.

In this instance, the shoulders 53, 55 are connected respectively to each of the sidewalls 7, 9. The overall directions of the shoulders 53, 55 form, with the directions of the respective sidewalls 7, 9, an angle referenced α (Alpha) of between 90° and 135° in the preloaded state, not running. The overall directions of the shoulders 53, 55 may extend generally parallel to the central axis 100 or be inclined substantially up to 45°. The shoulders 53, 55 are also substantially convex, bulging outwards. This shape makes it easier for earth to be detached during deformations. As an alternative, the shoulders 53, 55 are straight or even slightly concave when viewed in cross section.

In this instance, the flanks 57 of the crest 51 are respectively connected to each of the shoulders 53, 55. The overall directions of the flanks 57 make, with the overall directions of the shoulders 53, 55, an angle referenced θ (Theta) of between 90° and 120° in the preloaded state, not running. The overall directions of the flanks 57 extend substantially forming an angle referenced β (Beta) with respect to a radial direction of between 0 and 45° in the preloaded state, not running.

The height 201 of the crest 51 corresponds to the radial extension thereof, between the radial end of the crown 59 and the continuation of the exterior surfaces of the shoulders 53, 55, in the preloaded state, with the tire 1 not running, as depicted in FIG. 5. In this instance, the crest 51 extends radially beyond the shoulders 53, 55 over a height 201 of between 30 and 120 millimeters.

The width of the crest 51, in the axial direction, is referenced 105 and is comprised, in the axially-compressed state, between 30 and 120 millimeters.

Furthermore, the width 105 is selected so that the ratio of the width 105 of the crest 51 to the width 101 of the tire 1 is comprised between 15 and 70%.

In operation, first of all, the crown 59 of the crest 51 comes into contact with the ground first. The area of contact between the tire 1 and the ground is small. The bearing force is therefore enough to cause the crown 59 to penetrate the soil. The crest 51 digs gradually into the ground and forms the furrow. The shape of the crest 51 remains substantially unchanged during operation. The crest 51 therefore forms a stiffener. The configuration of the crest 51 makes it easier for the crown 59, followed by the flanks 57, to penetrate the ground. The flanks 57 dig into the soil in the manner of a wedge. They part the lateral walls of the furrow, compacting the soil. The flanks 57 form stiffeners. This improves the longer-term integrity of the furrow.

Secondly, the shoulders 53, 55 come into contact with the soil on each side of the furrow. The extent, or area, of contact between the tire 1 and the ground increases sharply. The soil resistance causes the shoulders 53, 55 to flex. The casing deforms in such a way that the shoulders 53, 55 flex under the effect of contact of the tire 1 with the ground. The deformation makes it easier to detach any soil that may have built up on the exterior surfaces. The crest 51 moves closer to the sole 3 under the effect of the flexing of the shoulders 53, 55. The crest 51 remains undeformed or practically undeformed.

Thirdly, at least part of the tread 5 comes to press against at least part of the sole 3. The collapsing movement is halted. Here, support is via the projections 75, 77 of the tire 1. The shoulders 53, 55 will then compact the soil on each side of the furrow. This makes it possible to improve the longer-term integrity of the furrow. The risk of soil on the surface between two furrows falling into and then filling the furrows after the roller has passed is reduced.

The inclination of the flanks 57 with respect to the shoulders 53, 55 generates a discontinuity. The inclination of the flanks 57 and the position of the discontinuity can be adapted in such a way as to control the width of the furrow. Regulating the shapes and dimensions of the crest makes it possible to control the depth of the furrow. The configuration of the projections 75, 77 allows control over the dynamic behavior of the tire 1 this being irrespective of the hardness and resistance of the soil. The presence of the chamber 11 under the shoulders 53, 55 makes it possible to generate a controlled collapsing of the tread 5. The shoulders 53, 55 deform enough to detach the earth which may build up on the tread 5, particularly on the shoulders 53, 55. When collapse and soil-detachment have occurred, the formation of the furrow by penetration of the crest 51 begins.

During the collapsing movement, the angle $\beta$ between the flanks 57 and the radial direction remains substantially constant, whereas the angle $\alpha$ between each shoulder 53, 55 and the respective sidewall 7, 9 and the angle $\theta$ between each shoulder 53, 55 and the crest 51 decrease progressively. The crest 51 of the tread 5 and the sole 3 move closer to one another. The sidewalls 7, 9 and, in particular, the radially exterior portion thereof, find themselves pushed axially outward. The lateral surfaces 33 are urged toward their corresponding supporting surface, for example toward the lateral surface 33 of an adjacent tire 1. This results in additional clamping, in operation, of each lateral surface 33 against an adjacent support face making it difficult for soil and/or debris to become inserted between the lateral surface 33 and the corresponding support face. This clamping is locally accentuated in the active angular portion of the tire 1. It is effective when the angular portion is in contact with the ground. This zone is the zone most exposed to the debris which may be strewn on the ground. The risk of soil and/or debris becoming inserted between two tires 1 is further reduced.

With the exception of the zones provided with the projections 75, 77, the sole 3, the tread 5 and the sidewalls 7, 9 have thicknesses substantially equal to one another. The thicknesses are constant around the circumference of the tire 1. This makes it easier to predict the dynamic behavior. It also limits the risks of appearance of stress concentration zones and zones where undesired folding may begin.

In the examples described here, the casing of the tire 1 is made of a single piece. It is made based on elastomer, for example rubber or polyurethane. The material used here has a Shore A hardness of between 50 and 70.

In the examples described here, the tire 1 further comprises reinforcements 13, 15 or reinforcers, in this instance three of them. The reinforcements 13, 15 are formed of metal rings embedded in the sole 3. The rings are obtained by grouping metal wires together into bundles. The reinforcements 13, 15 may be viewed as rings or annular bead wires extending circumferentially in the sole 3. A central reinforcement 13 is positioned in the radially inner half-thickness of the sole 3, namely near the seat surface 31. Two lateral reinforcements 15 are arranged in the radially outer half-thickness of the sole 3, at the junction with the side walls 7, 9, and in the vicinity of each of the lateral surfaces 33. The lateral reinforcements 15 are symmetric with one another with respect to the midplane 200. The central reinforcement 13 has a substantially rectangular cross section elongate in the axial direction. The lateral reinforcements 15 each have a substantially circular cross section. In alternative forms, the tire 1 comprises, in addition to or as replacement for the metal reinforcements 13, 15, reinforcements in the form of fabric or plies, for example made based on polyester and/or on polyamide.

The tire 1 here has relief elements, formed in the tread 5, in this instance in the crown 59. The relief elements form exceptions to the uniform nature of the tire 1 around its circumference. The relief elements are substantially equidistant along the circumference. The relief elements improve the grip of the tire 1 in the soil and prevent the roller from being prevented from turning and scraping the ground. The relief elements form roughnesses in the soil, in this instance in the bottom of the furrow, making it easier for small pockets of water to accumulate after inclement weather or watering. This then improves the penetration of water into the soil. Furthermore, when the furrows are made on sloping land, the extent to which the water in the bottom of the furrows nuns off is limited as too are the phenomena of leeching of the soil. In this instance, the relief elements comprise impressions 93 or concavities.

As an alternative, the relief elements comprise crampons 91, or projections, as a replacement for or in combination with the impressions 93.

In the examples described here and as can be seen in the figures in radial section, the presence of relief elements does not locally alter the thickness of the tread 5. On the contrary, the interior surface of the tread 5 on the side of the chamber 11 has shapes that complement the relief elements formed in the exterior surface of the tread 5. The creation of a crampon 91 in the exterior surface of the tread 5 leads to there being a corresponding recessed shape in the interior surface of the side of the chamber 11. The crampons 91 and/or the recesses 93 therefore form crown reinforcers 59 that reinforce the tread 5. The appearance of localized additional thicknesses or thinning is avoided.

Reference is now made to FIGS. 6 to 17. Elements functionally similar to those of the embodiments described hereinabove bear the same numerical references.

Figures 6, 7:
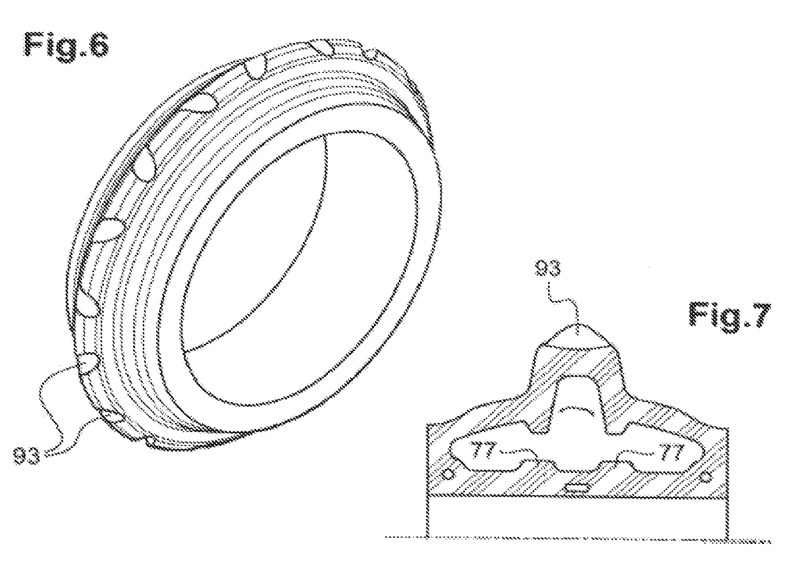
FIG. 6 is a perspective view of a tire according to the invention.
FIG. 7 is a view in section of the tire of FIG. 6.

FIGS. 6 and 7 show a tire 1 analogous to the tire 1 of FIGS. 1 to 4 except for the shape of the 77 of the sole 3 which are wider than the projections 75 of the tread 5. In the axially preloaded state, the crest width 105 is approximately 50 mm whereas the overall width 101 is approximately 150 mm, namely a ratio of around 33%. The crest height 201 is approximately 40 mm.

Figures 8, 9:
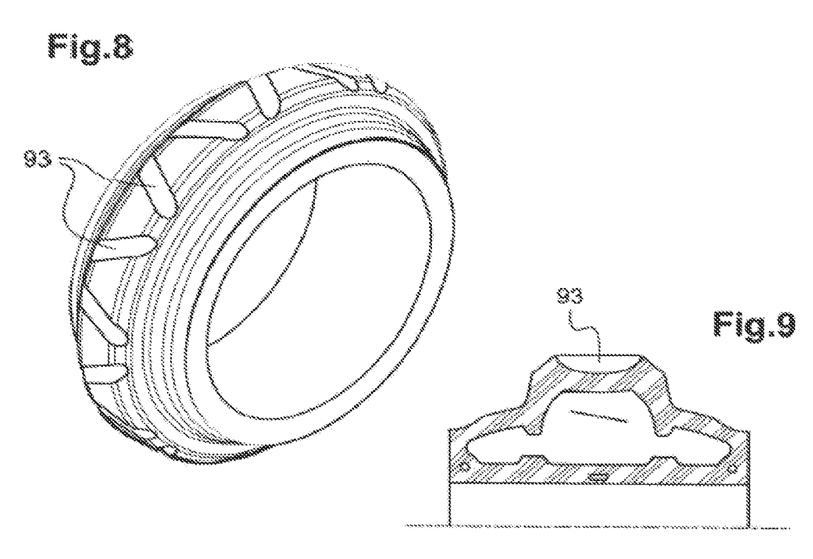
FIG. 8 is a perspective view of a tire according to the invention.
FIG. 9 is a view in section of the tire of FIG. 8.

FIGS. 8 and 9 show a tire 1 with a ratio of crest width 105 to total width 101 of the tire 1 that is greater than in the preceding embodiments. The impressions 93 have an elongate shape angled across the width of the crest 51, the direction alternating every alternate instance around the circumference. In the axially preloaded state, the crest width 105 is around 96 mm whereas the overall width 101 is around 200 mm, giving a ratio of around 48%. The crest height 201 is around 40 mm.

Figures 10, 11:
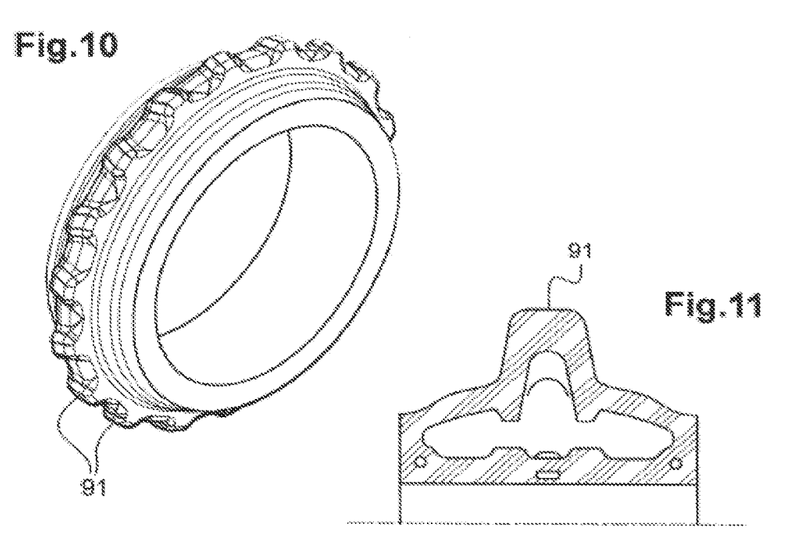
FIG. 10 is a perspective view of a tire according to the invention.
FIG. 11 is a view in section of the tire of FIG. 10.

FIGS. 10 and 11 show a tire 1 with a ratio of crest width 105 to total width 101 of the tire 1 that is smaller than in the previous embodiments. The impressions 93 have been replaced by crampons 91 generally in the form of square waves. In the axially preloaded state, the crest width 105 is around 40 mm whereas the total width 101 is around 125 mm, giving a ratio of around 30%. The crest height 201 is around 33 mm, crampons 91 inclusive. This embodiment is particularly effective in working light soil at high speed.

Figures 12, 13:
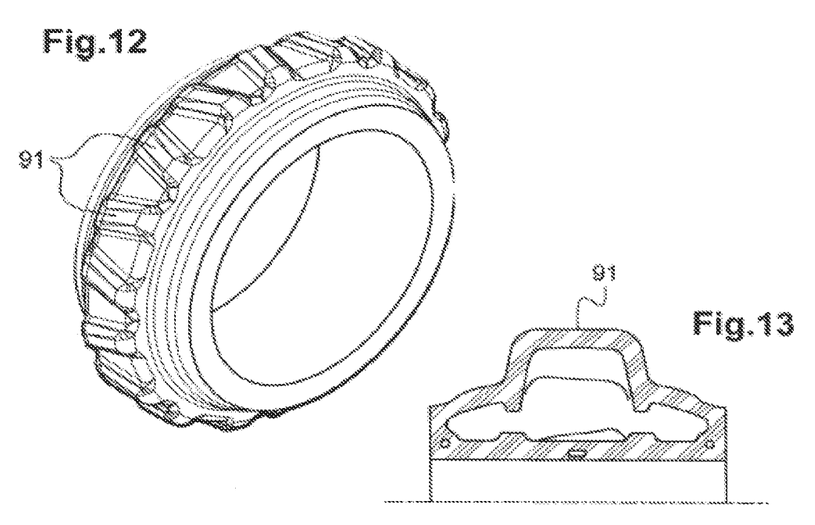
FIG. 12 is a perspective view of a tire according to the invention.
FIG. 13 is a view in section of the tire of FIG. 12.

FIGS. 12 and 13 show a tire 1 with a ratio of crest width 105 to a total width 101 of the tire 1 that is large. The crampons 91 have an elongate shape angled across the width of the crest 51, the direction alternating every alternate instance around the circumference. In the axially preloaded state, the crest width 105 is around 96 mm whereas the overall width 101 is around 200 mm, giving a ratio of around 48%. The crest height 201 is around 40 mm, crampons 91 inclusive. This embodiment is particularly effective in working light soil at high speed.

Figures 14, 15:
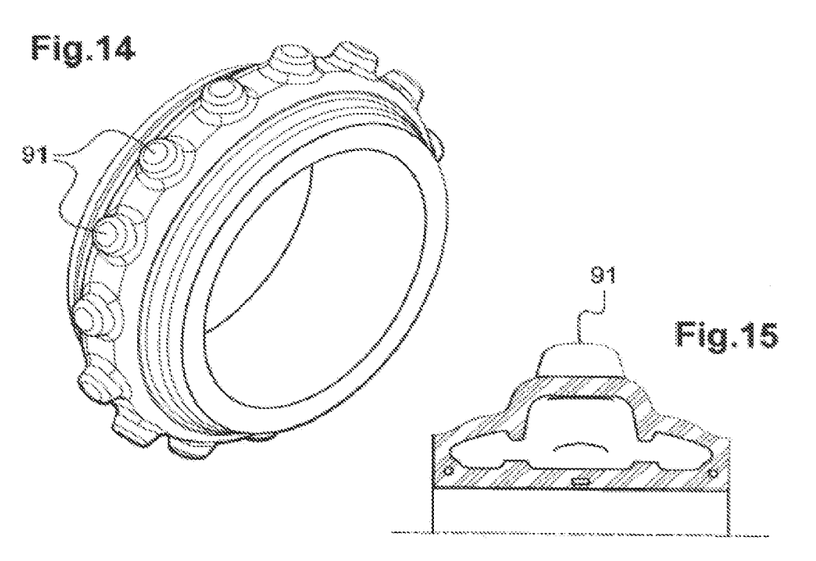
FIG. 14 is a perspective view of a tire according to the invention.
FIG. 15 is a view in section of the tire of FIG. 14.

FIGS. 14 and 15 show a tire 1 with a ratio of crest length 105 to total width 101 of the tire 1 that is high. The crampons 91 have a cross section of circular shape and are substantially identical to one another. In the axially preloaded state, the crest width 105 is around 100 mm whereas the total width 101 is around 200 mm, giving a ratio of around 50%. The crest height 201 is around 53 mm, crampons 91 inclusive.

Figures 16, 17:
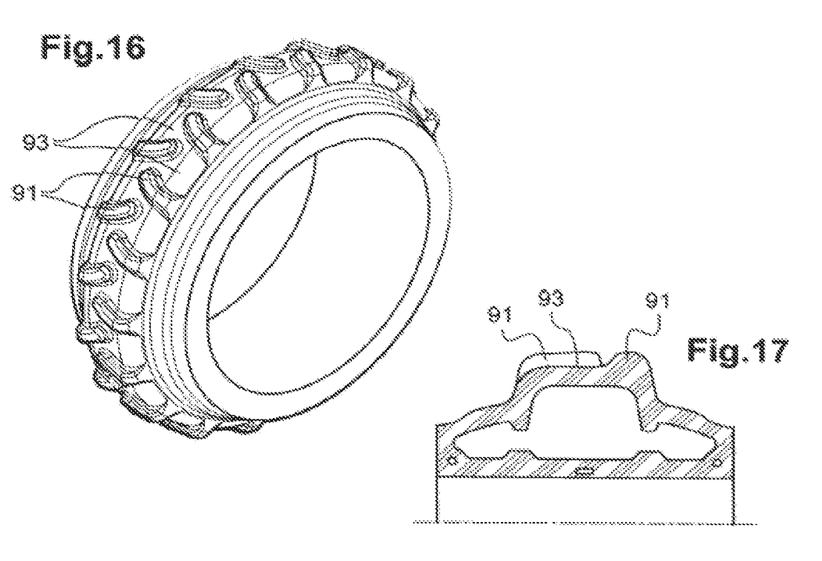
FIG. 16 is a perspective view of a tire according to the invention.
FIG. 17 is a view in section of the tire of FIG. 16.

In the embodiments of FIGS. 1 to 15, the shapes and arrangements of the crampons 91 and/or recesses 93 are such that the tire 1 does not have any imposed direction of running. The tire 1 can run equally well in one direction or the other. It may therefore be mounted on its support 2 in one direction or the other equally. In the embodiment of FIGS. 16 and 17, the tire 1 has crampons 91 in the shape of half-chevrons on each side of the crest 51. The tire 1 has a direction of mounting on its support 2. In the axially preloaded state, the crest width 105 is around 100 mm, whereas the overall width 101 is around 200 mm, giving a ratio of around 50%. The crest height 201 is around 41 mm, crampons 91 inclusive. This embodiment exhibits significant shoulder deformation and good self-cleaning.

In the embodiment of FIGS. 1 and 3, the roller portion depicted is a central portion. The tires 1 are the same as one another. As an alternative, a roller may comprise tires of different configurations in order to create varying furrows. As an alternative, at least some of the tires of a roller may be asymmetric. For example, at least one of the tires arranged at the ends of the support 2 may partially exhibit a specific shape, particularly one that corresponds to a shape of the abutment flange.

The invention may also be seen to be an agricultural tool comprising a tire as described hereinabove or a furrow press equipped with a tire as described herein above.

The invention is not restricted to the tire examples described hereinabove merely by way of example but encompasses all alternative forms that a person skilled in the art might envision within the scope of the claims that follow.

The invention claimed is:

1. A tire for a furrow press roller of the type comprising:
   a sole via which the tire is mounted on a field roller support,
   a tread opposite to the sole, and
   two sidewalls connecting the tread to the sole, the sole, the tread and the side walls together delimiting a non-inflatable chamber,
   wherein the tread comprises:
   at least one crest portion, and
   two shoulder portions each connecting the crest portion to a respective sidewall, the chamber extending partially at least laterally under the shoulder portions and radially into the crest portion.

2. The tire according to claim 1, in which the shoulder portions are of convex overall shape.

3. The tire according to claim 1, in which an exterior surface of the crest-shaped portion bears at least one relief element.

4. The tire according to claim 1, in which the sole and/or the tread comprise at least one portion projecting into the chamber under the shoulder portions and arranged in such a way as to limit, through abutment, an extent to which the sole and the tread can move closer together.

5. The tire according to claim 1, in which at least one of the sidewalls has a frustoconical lateral surface.

6. The tire according to claim 1, in which at least one of the two shoulder portions is connected to a respective sidewall so that an overall direction of the shoulder portion and an overall direction of the respective sidewall form an angle ($\alpha$) of between 90° and 135°.

7. The tire according to claim 1, in which the crest-portion has inclined flanks such that an overall direction of each of the flanks forms an angle ($\beta$) of between 0° and 45° with respect to a radial direction.

8. The tire according to claim 1, in which at least one of the two shoulder portions is connected to the crest portion so that an overall direction of the shoulder portion and an overall direction of the crest portion form an angle ($\theta$) of between 900 and 120°.

9. The tire according to claim 1, in which the crest-portion extends radially beyond the shoulder portions over a height of between 30 and 120 millimeters.

10. The tire according to claim 1, in which a ratio of a width over which the crest portion extends to a total width of the tire is between 15% and 70%.

11. A furrow press roller comprising a support and at least one tire according to claim 1, that mounts on the support.

* * * * *